United States Patent Office 3,244,524
Patented Apr. 5, 1966

3,244,524
U.V. ABSORBING COMPOSITION
Donald E. Trucker, Binghamton, N.Y., assignor to General Aniline & Film Corporation, New York, N.Y., a corporation of Delaware
Filed Mar. 1, 1960, Ser. No. 12,146
10 Claims. (Cl. 96—84)

The present invention relates to ultraviolet absorbers and compositions containing the same which are particularly suitable for protecting organic media from damage by exposure to ultraviolet radiation.

Industry has become increasingly aware of the damage which may be wrought to various organic systems through the effect of ultraviolet light. Said damage runs the gamut from acceleration of the degradation of certain foodstuffs, such as fruits, oils and fats, to injury to the human body by excessive sunburn. Fading of colored objects such as textiles, photographic prints and the like is often attributable to long exposure to sunlight. Plastics, resins and other film-forming materials are rendered brittle and often caused to deteriorate through ultraviolet radiation.

A recognition of the havoc which can be wrought by U.V. light to certain organic media has led to the use of various compounds called U.V. absorbers as protecting agents for such a media. To this end, it has been recommended that films, foils and the like derived from a hydrophilic colloidal carrier such as gelatin, polyvinyl alcohol, carboxymethyl cellulose, casein or partially hydrolyzed PVM/MA be prepared with a content of a U.V. absorber such as, for example, 2,4-dihydroxyacetophenone. The resulting films and foils may then be used as wrappings or protective coatings for foods, textiles, photographic colored prints and other media subject to change under the influence of ultraviolet light. While many of the substances so employed are effective, particularly when coated or used in relatively thick layers or masses such as those ranging from 50 microns upward, the results obtained are far from optimum when the absorbers are employed in relatively thin layers such as those of a few microns to about 10 microns. In the latter case, the compounds have very little absorbing power for U.V. radiation and, hence, are incapable of operating to avert the damaging effect of such radiations.

A U.V. absorber, in order to meet the demands of the trade, should possess the following prerequisites:

(1) The absorber should exhibit a cutoff near 400 microns when coated in a film or foil.

(2) It should have a high extinction coefficient (defined in pages 180 and 181 of "The Science of Color," written by the Committee on Colorimetry of the Optical Society of America, published by Thomas W. Crowell Company, New York, New York, and copyrighted 1953).

(3) It should be stable to light.

(4) It should allow incorporation of relatively large amounts in the colloidal medium in which it is carried.

It has been previously stated that one use of U.V. absorbers is in photographic color film as a protective medium for photographic prints or images formed in the film. If so used, the coating of the U.V. absorber should possess these additional characteristics:

(5) It should not wash out on processing.

(6) It should be colorless before and after processing and should not become yellow as most U.V. absorbing films or foils tend to do.

(7) It should be photographically inactive when incorporated in the photographic material.

I have now discovered that all these properties are possessed by a film or foil of a hydrophilic colloid having dissolved therein a water-soluble, fluorescent U.V. absorber of the type known in the textile field as an "optical brightener" and having dispersed therein droplets of a water-insoluble, non-fluorescing, oil-soluble U.V. absorber. The oil-soluble U.V. absorbers are of the class generally used for such purposes but when used alone do not possess all of the properties required. On the other hand, the optical brighteners alone are not entirely satisfactory. It is, therefore, rather strange that the mixture when coated as stated is free from the defects of the known U.V. absorbers when used per se. This is illustrated, for example, by the reduction of yellowing on aging of the oil-soluble component and by the fact that more total absorber can be included in the film or foil, thus ensuring better U.V. absorption. It is further exemplified by the fact that the mixture is more stable than the individual absorbers and affords greater protection from fading of dye images in photographic materials than can be expected from the additive effects of the two absorbers. In other words, the mixture exhibits a synergistic effect when used for U.V. absorbing purposes.

The nonfluoroscent, oil-soluble U.V. absorbers contemplated for use herein are the known U.V. absorbers such as 2,4-dihydroxyacetophenone, 2-phenylcinchoninic acid, 3'-aminophenyl - 8-hydroxycinchoninic acid, 2'-amino - 2-phenylcinchoninic acid, 4'-amino-2-phenyl-3-carboxyethylcinchoninic acid, 4-benzoyl-resorcinol, 2,2'-dihydroxy - 4,4'-dimethoxybenzophenone, 2,2'-4,4'-tetrahydroxybenzophenone, a hydroxytolybenzotriazole, 5-benzal - 3-cetyl - 2-phenylimino - 4-thiazolidone, 3,4-dimethoxy - 2-phenylbenzoxazole and the like.

Any one of these nonfluorescent, oil-soluble absorbers is dispersed in the hydrophilic colloid in the form of finely divided liquid particles by dissolving it in a substantially water-insoluble, low molecular weight, organic crystalloidal material having a boiling point above 175° C., said material having a high solvent action for the U.V. absorber, the nature and proportions of the U.V. absorber and crystalloidal material being so selected that particles thereof are liquid under conditions of coating. Such materials will hereafter be designated as "oils." Examples of such oils are dimethylphthalate, phenylethyl alcohol, dibutylphthalate, tricresylphosphate, n-hexylphenyl-carbinol, N-n-amyl-phthalimide, diphenyl-mono-p-tertiary-butylphenylphosphate and the like. Other examples of such compounds may be found in U.S. Patent 2,322,027 granted June 15, 1943.

The water-soluble, fluorescent U.V. absorbers are, as stated, those known in the trade as optical brighteners. Examples of such compounds are the alkali metal salts of 4,4'-bis-(p-acetamidobenzamido)stilbene - 2,2'-disulfonic acid, N,N'-bis-[2,4-dihydroxy - 1,3,5-triazyl-(6)]-benzidine - 2,2'-disulfonic acid, 4,4'-bis-[2-hydroxy - 4-phenylamino - 1,3,5-triazyl - (6)-amino] stilbene - 2,2'-disulfonic acid, 7-diethylamino - 4-methyl-coumarin and the other optical brighteners listed in British Patent 709,-111 dated May 19, 1954, both by general formula and by specific illustration.

In producing the light absorbing compositions, the nonfluorescing, oil-soluble U.V. absorber is dissolved in one of the listed oils and this oil solution dispersed in a water solution of the optical brightener in the presence of a dispersing agent such as a high fatty alcohol sulfate, i.e., lauryl sulfate, the sodium salt of 1-isobutyl-4-ethyl-1-octane sulfate or the products disclosed in U.S. Patent 1,932,180, and a hydrophilic colloidal carrier such as those mentioned previously. Preferably, the optical brightener is dissolved in boiling water with use of a homogenizer. The solution is not cooled before adding the other ingredients. After admixing the water and oil-soluble components, the mass is mixed in a homogenizer until the particle size is below one micron. The dispersion is then coated and dried to a thickness of from about 3 to 10 microns.

The total quantity of U.V. absorber in the films or foils amounts to about 3 to 7 g. per 100 g. of the components which remain in the film or foil, to wit, the hydrophilic colloidal carrier, the oil former in which the non-fluorescent U.V. absorber is dissolved and the dispersing agent. The ratio of the two U.V. absorbers varies from about 1 to 5, to 5 to 1. Preferably, however, the ratio of the absorbers is about 1 to 1. The quantity of the oil is that sufficient to place the U.V. absorber in the form of liquid droplets. The quantity of the dispersing agent is such as to obtain a dispersion in which the particles have a size of less than one micron. The quantity of water, on the other hand, is that which will effect dissolution of the fluorescent U.V. absorber and the hydrophilic colloid. Persons skilled in the art can readily determine the quantities of the three last-named components.

The invention is further illustrated by the accompanying drawings and the following examples but it is to be understood that the invention is not restricted thereto.

Referring to the drawings, FIG. 1 shows three curves of the spectra of three different unprocessed films each coated with a layer containing a different U.V. light absorbing composition.

The graphs were prepared by plotting percent transmittance as ordinates and wave length as abscissa. Curve 4 of FIG. 1 employs a mixture of 2,2'-dihydroxy-4,4'-dimethoxybenzophenone dissolved in dimethyl phthalate and dispersed in gelation and 4,4'-bis-(p-acetamidobenzamido)stilbene-2,2'-disulfonic acid dissolved in gelatin. The quantities of the two U.V. absorbers and the quantity of gelatin are the same as that described in Example I. Curve 5, on the other hand, shows the same composition with the exception that the nonfluorescent U.V. absorber is 2,2'-4,4'-tetrahydroxybenzophenone. Curve 6 shows the same composition as curve 4 excepting that the nonfluorescent U.V. absorber is hydroxytolylbenzotriazole.

Figure 1:
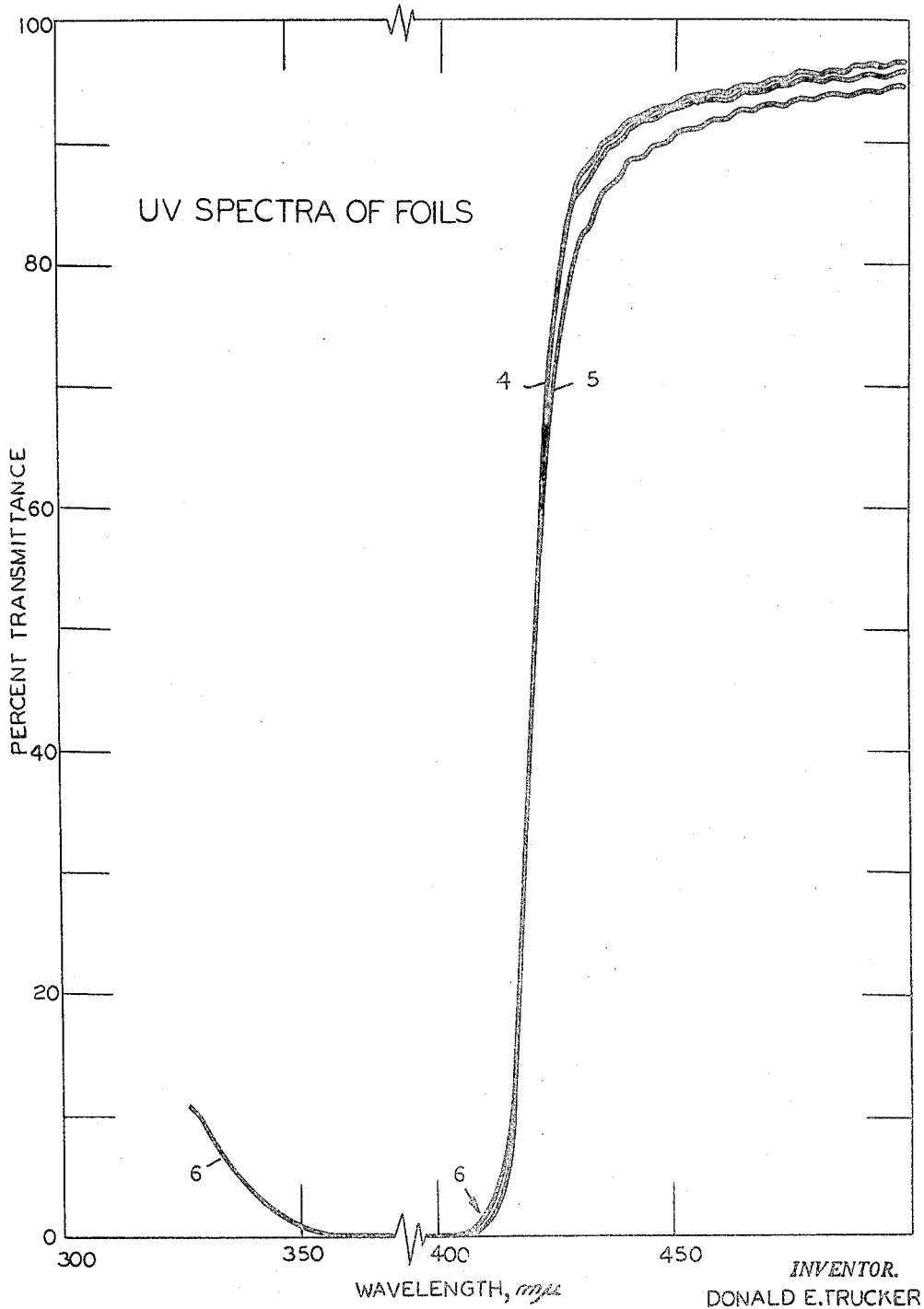
Figure 2:
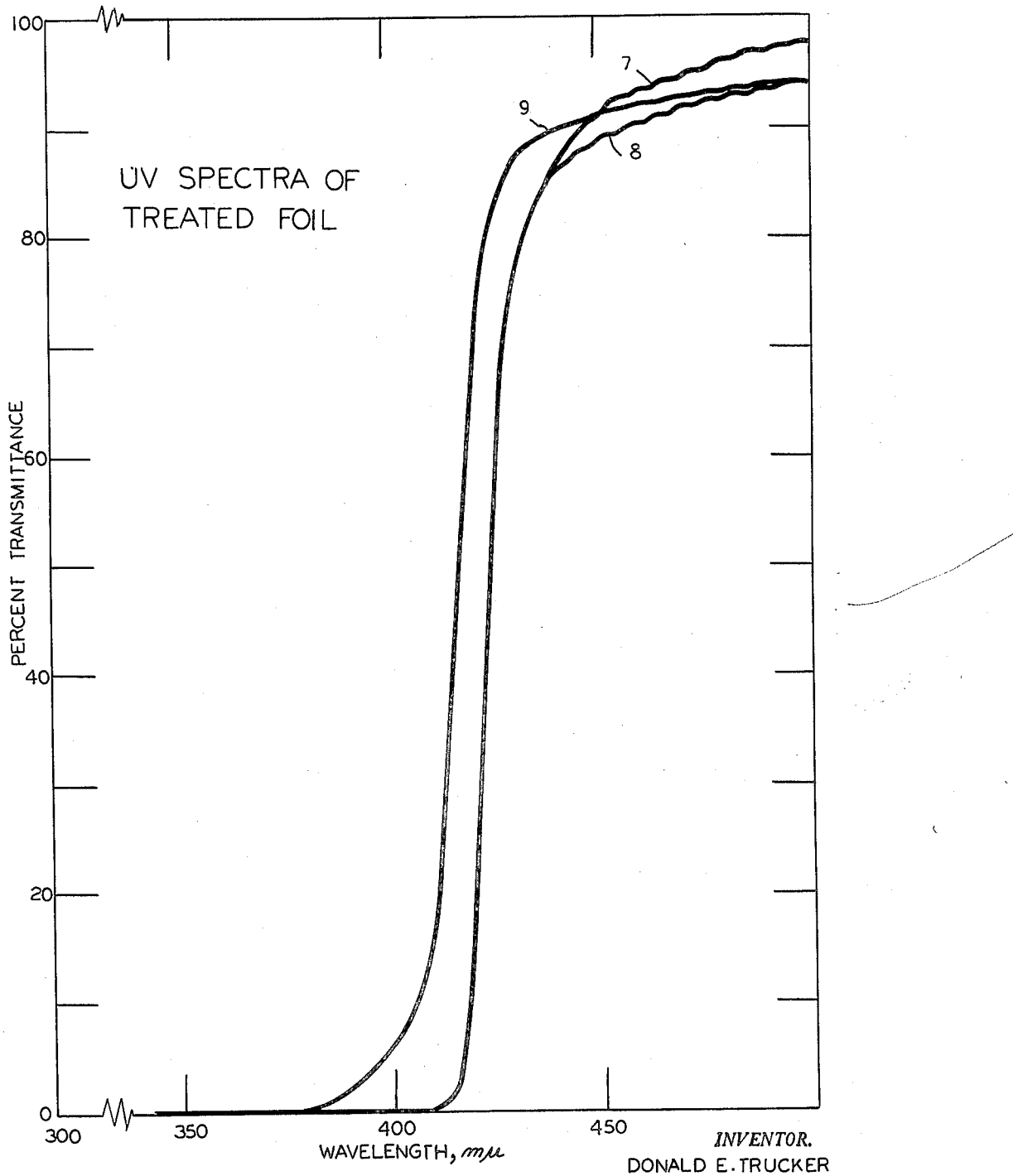
FIG. 2 shows three curves of the spectra of film having a layer containing one of my ultraviolet light absorbing compositions, one curve being of the film in the unprocessed state, another of the film in the processed state and the third the condition of the film after it has undergone a 20-hour light fade test.

In FIG. 2 the curves are plotted in the same fashion as in FIG. 1 while using the composition of curve 6 of FIG. 1. Curve 7 represents the unprocessed film; curve 8 the processed film and curve 9 a 20-hour light fade test on processed film. It will be seen that there is very little difference in the shape of curves 8 and 9 representing the processed film and the film after the light fade test.

Figure 3:
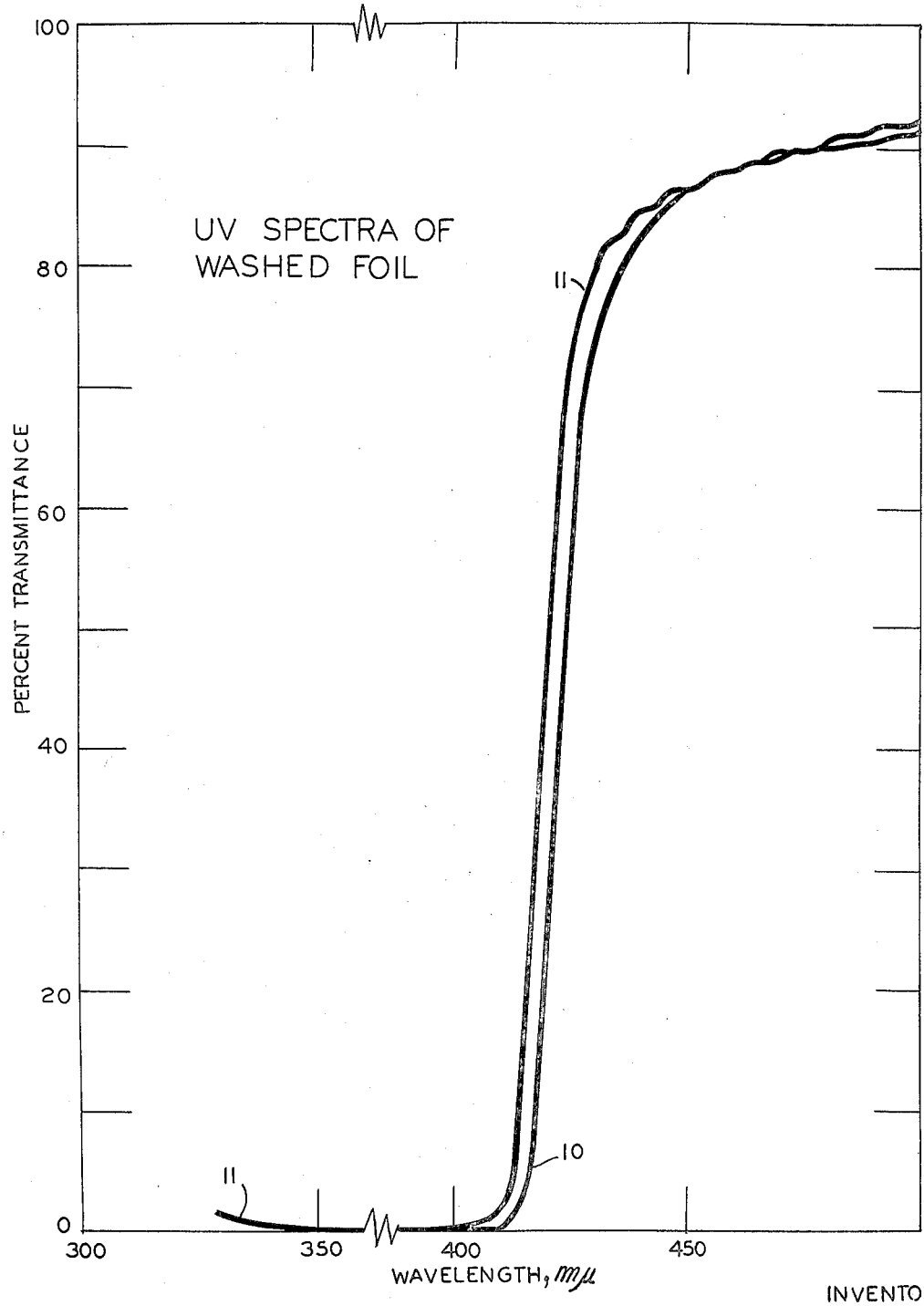
FIG. 3 shows two curves of the spectra of a film having a layer containing the same ultraviolet absorbing composition as in FIG. 2, one curve being of the unprocessed film and the other of the same film after a 24-hour tap water wash.

In FIG. 3 the curves are plotted in the same fashion as in FIG. 1 while using the composition of curve 6 of FIG. 1. Curve 10 discloses the spectra of the unprocessed film and curve 11 the spectra of the same film after a 24-hour tap water wash. It will be observed that both curves are quite similar.

*Example I*

The following ingredients were used in making up a U.V. absorbing composition which was dried and coated to a thickness of 10 microns:

4,4' - bis-(p-acetamidobenzamido)stilbene-2,2'-disulfonic acid _____ g__ .225
Hydroxytolylbenzotriazole _____ g__ .225
20% gelatin _____ ml__ 12
Dimethyl phthalate _____ ml__ 4.5
25% lauryl sulfate _____ ml__ .5
Water _____ ml__ 63

The water-soluble U.V. absorber is dissolved over a three-minute period in the water at a boiling temperature while using a preheated homogenizer. The solution is kept warm before adding the other materials. The oil-soluble U.V. absorber is dissolved in the dimethyl phthalate by stirring and warming to 60° C.

The gelatin is warmed to 40–50° C. and added to the water solution in the preheated homogenizer, mixed for three minutes and the lauryl sulfate added, after which the oil solution of the nonfluorescent, oil-soluble absorber is added. The composition is mixed in the homogenizer for three minutes or until the particle size is below one micron. The dispersion is then dried and coated to a thickness of about 10 microns.

The foil thus produced may be used for any of the stated purposes and is particularly effective when coated in a light-sensitive silver halide color film.

*Example II*

The procedure was the same as in Example I excepting that the oil-soluble, nonfluorescent absorber is replaced by 2,2'-dihydroxy-4,4'-dimethoxybenzophenone.

*Example III*

The procedure was the same as in Example I excepting that the oil-soluble, nonfluorescent U.V. absorber is replaced by 2,2'-4,4'-tetrahydroxybenzophenone. The results are similar to those of Example I.

Modifications of the invention will occur to persons skilled in the art. Thus, for example, any of the oil formers or U.V. absorbers mentioned may be employed. Similarly, different dispersing agents than those of the examples may be used and the colloidal carrier may be any hydrophilic colloid other than gelatin. I, therefore, do not intend to be limited in the patent granted except as necessitated by the appended claims.

I claim:
1. An ultra-violet absorbing composition comprising a hydrophilic colloidal carrier capable of forming a light transmitting solid film at ordinary temperature, said carrier having uniformly dispersed therein in the form of particles having a size less than one micron, a solution of a nonfluorescing, oil-soluble U.V. absorber in a substantially water-insoluble, a low molecular weight organic crystalloidal material having a boiling point above about 175° C. and a high solvent action for the U.V. absorber, and having dissolved therein a water-soluble, fluorescent U.V. absorber, said film exhibiting a cutoff near 400 microns, having a high extinction coefficient and being stable to light.

2. The article as defined in claim 1 in which the hydrophilic colloidal carrier is gelatin.

3. The article as defined in claim 1 wherein the oil-soluble, non-fluorescing, ultra-violet light absorber is a compound selected from the group consisting of 2,2'-dihydroxy-4,4'-dimethoxybenzophenone, 2,2'-4,4' - tetrahydroxybenzophenone, a hydroxytolylbenzotriazole, 5-benzal-3-cetyl-2-phenylimino-4 - thiazolidone, 3,4 - dimethoxy-2-phenylbenzoxazole, 2,4-dihydroxy-acetophenone, 2,4'-dihydroxybenzophenone, 4-benzoylresorcinol, 2-phenylcinchoninic acid, 3'-aminophenyl-8 - hydroxycinchoninic acid, 2'-amino-2-phenylcinchoninic acid and 4'-amino-2-phenyl-3-carboxyethylcinchoninic acid.

4. The article as defined in claim 1 wherein the film has a thickness of from 5 to 10 microns.

5. The article as defined in claim 1 wherein the water-soluble, fluorescent U.V. absorber is selected from the class consisting of those of the following constitution:

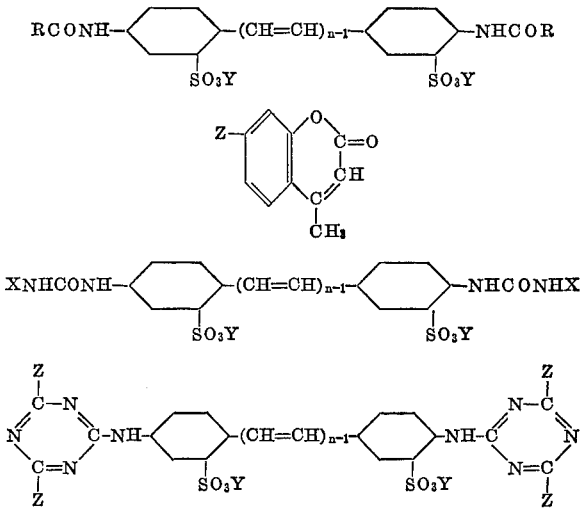

and

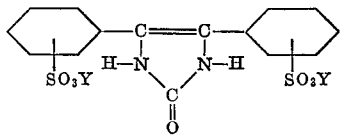

wherein R is a phenyl radical; X is selected from the class consisting of a phenyl and an alkyl radical; Z is selected from the class consisting of hydroxy, an alkylamino, hydroxyalkylamino, cycloalkylamino and N-morpholinyl radical; Y is selected from the class consisting of hydrogen and a water solubilizing cation; and $n$ is a whole number from 1 to 2.

6. An ultraviolet absorbing composition comprising a gelatin film having uniformly dispersed therein finely divided liquid particles having a size less than one micron, of hydroxytolylbenzotriazole dissolved in dimethylphthalate and having dissolved therein 4,4'-bis-(p-acetamidobenzamido)stilbene-2,2'-disulfonic acid.

7. A light-sensitive photographic color film having a layer of a hydrophilic colloidal carrier capable of forming a light transmitting solid film at ordinary temperatures, said carrier having uniformly dispersed therein in the form of particles having a size less than one micron, a solution of a non-fluorescing, oil-soluble U.V. absorber in a substantially water-insoluble, low molecular weight organic crystolloidal material having a boiling point above about 175° C. and a high solvent action for the U.V. absorber, and having dissolved therein a water-soluble fluorescent U.V. absorber, said film exhibiting a cutoff near 400 microns, having a high extinction coefficient and being stable to light.

8. A light-sensitive photographic color film containing a coating of gelatin having dispersed therein finely divided liquid particles having a size less than one micron, of hydroxytolylbenzotriazole dissolved in dimethylphthalate and having dissolved therein 4,4'-(p-acetamidobenzamido)stilbene-2,2'-disulfonic acid.

9. The article as defined in claim 7 wherein the U.V. absorbing colloidal carrier is coated to a thickness of 5 to 10 microns.

10. The article as defined in claim 8 wherein the U.V. absorbing gelatin layer is coated to a thickness of 5 to 10 microns.

References Cited by the Examiner

UNITED STATES PATENTS

| | | | |
|---|---|---|---|
| 2,322,027 | 6/1943 | Jelley et al. | 96—94 |
| 2,747,996 | 5/1956 | Edgerton et al. | 96—11 |
| 2,801,170 | 7/1957 | Vittum et al. | 96—97 |
| 2,976,168 | 3/1961 | Thompson et al. | 96—84 |
| 3,004,896 | 10/1961 | Heller | 252—300 |
| 3,043,709 | 7/1962 | Amborski | 252—300 |
| 3,068,295 | 12/1962 | Folkers et al. | 167—90 |

NORMAN G. TORCHIN, *Primary Examiner.*

PHILIP E. MANGAN, *Examiner.*

Disclaimer 3,244,524.—*Donald E. Trucker*, Binghamton, N.Y. U. V. ABSORBING COMPOSITION. Patent dated Apr. 5, 1966. Disclaimer filed Sept. 30, 1982, by the assignee, *Eastman Kodak Co.*

Hereby enters this disclaimer to all claims of said patent.

[*Official Gazette March 22, 1983.*]